United States Patent [19]

Fedon et al.

[11] 3,868,438
[45] Feb. 25, 1975

[54] METHOD FOR PROCESSING SPECTACLE FRAMES
[75] Inventors: Vigilio Fedon; Frazione Di Vallesella, both of Belluno, Italy
[73] Assignee: Salottica S.r.l., Brescia, Italy
[22] Filed: June 8, 1973
[21] Appl. No.: 368,121

[30] Foreign Application Priority Data
June 13, 1972  Italy..................................25614/72

[52] U.S. Cl................. 264/156, 264/154, 264/295, 351/178
[51] Int. Cl............................................ B29d 11/00
[58] Field of Search ........... 264/322, 153, 154, 295, 264/156; 351/154, 178

[56] References Cited
UNITED STATES PATENTS
1,386,068   8/1921   Maynard........................ 264/322 X

| | | | |
|---|---|---|---|
| 2,582,798 | 1/1952 | Russell................................ 264/154 |
| 2,589,419 | 3/1952 | Moncrief............................ 264/153 |
| 3,229,303 | 1/1966 | Jonassen.......................... 351/86 X |
| 3,608,120 | 9/1971 | Seiler.............................. 264/295 X |
| 3,664,734 | 5/1972 | Rivoire .......................... 251/154 X |

*Primary Examiner*—Richard R. Kucia
*Attorney, Agent, or Firm*—Waters, Roditi, Schwartz & Nissen

[57]                ABSTRACT

A method for shaping spectacle frames is disclosed in which the shaping operation of a thermoplastic material slab is carried out in two times, namely: a first hot shaping operation shapes the curvature of the rim area and, if desired, also of the bridge area, the second stage, still in hot condition, being intended to define the meniscus shape of the lens rims.

2 Claims, 5 Drawing Figures

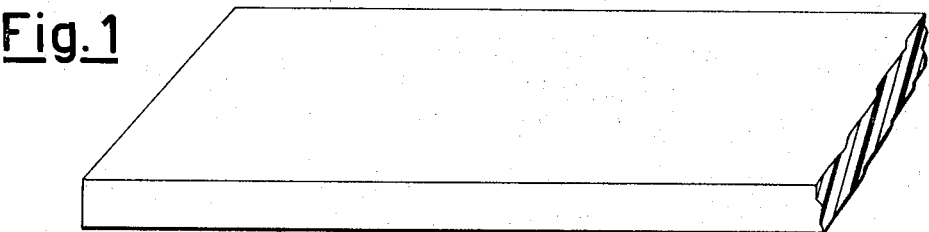
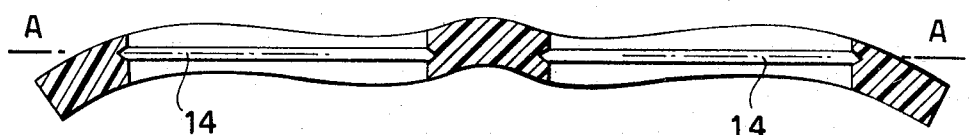
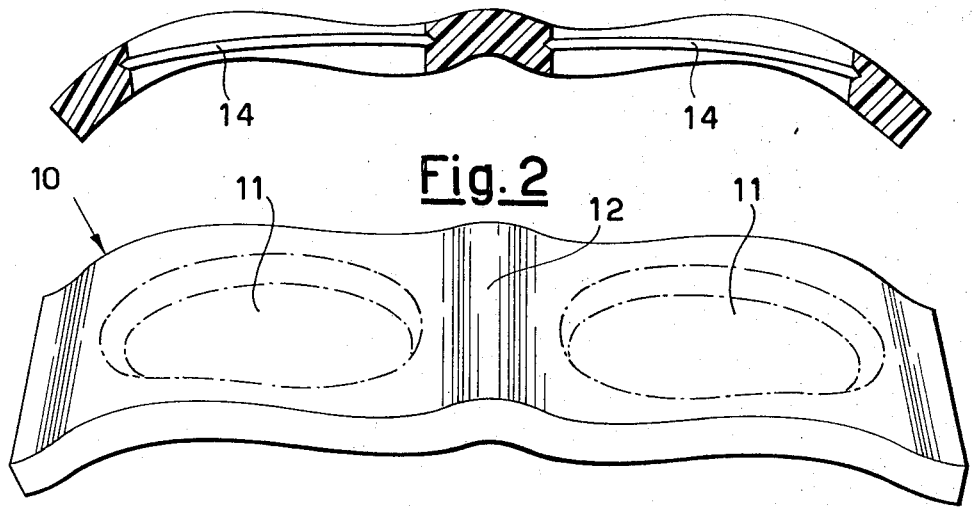
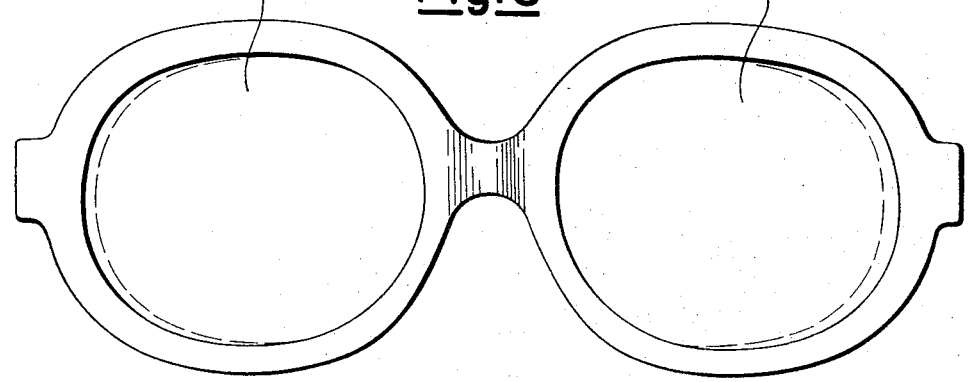

METHOD FOR PROCESSING SPECTACLE FRAMES

This invention generally relates to an improved method for processing spectacle frames made of a thermoplastic material, as obtained from slabs.

More particularly, the present invention relates to a method for processing spectacle frames of the wrapping type which are adapted to receive both spectacle glasses and colored sunglasses.

Up to now the processing of such frames of a thermoplastic material in slabs has been carried out by operating in the following manner: from a planar slab of a thermoplastic material there is obtained by stamping or milling the rough shape of the front portion of the frame, then there are milled the grooves intended to receive the edges of the lenses, and then the front portion of the frame is appropriately shaped with heat so as to form the bridge and sometimes the bending of the portion intended for being connected to the sides is also shaped, by carrying out the so-called meniscus formation, that is a configuration of the lens rim and consequently of the relevant grooves, which makes them adapted to receive meniscus lenses.

Thus, especially in the case of the use of optical lenses, the base of the meniscus is strictly bound to the base of curvature of the lenses: consequently it is not possible to obtain frames which are wrapping in the desired manner and for aesthetical reasons and for sheltering the eyes from the light also laterally.

An object of the invention is to provide a processing method which permits to obtain a spectacle frame, particularly but not exclusively sight spectacles, having a configuration which is more wrapping than that which have been obtained with the conventional processing methods.

To this end, according to the invention, it has been thought to split the meniscus shaping operation of the rims and their grooves intended to receive the lenses, said step being carried out conventionally as a single operation, in two discrete stages. The invention in fact suggests to proceed in the following manner: a planar rectangular slab of an appropriate thermoplastic material is shaped in hot condition a first time so as to define in it the bridge area, the areas where the sides are to be inserted and the desired curvature of the rims; in the thus obtained slab the rims are then milled with their own grooves which are suitably meniscus shaped by shaping the material in hot condition again. Those skilled in the art will understand that such a double shaping of the material gives the possibility of making a frame having a configuration which is more wrapping than that which can be obtained with the conventional methods, or at any rate any desired configuration in which the groove is capable of receiving the lens in any case.

The foregoing and other features, objects and advantages of the invention will become clearer from the scrutiny of the ensuing description which is given with reference to the accompanying drawing which show the different stages of the method according to the invention.

In the drawing:

FIGS. from 1 to 5 diagrammatically show the different processing stages of the method according to the invention.

In FIG. 1 of the drawing the reference numeral 10 generally indicates a planar slab of a thermoplastic material which is the starting material from shaping the spectacle frame according to the invention.

The slab 10 is shaped in hot condition for a first time with an undulated trend (FIG. 2) so as to define therein two side areas 11 wherefrom the rims of the lenses will be formed as well as the connection zones for the spectacle sides, and a central area 12 wherefrom the bridge will be formed. In the slab which has been thus shaped there will be milled the lens rims 13 (FIG. 3) with their relative grooves 14; as can be clearly seen in FIG. 4, the grooves 14 lie on a plane indicated by the line A—A. The frame portion as shown in FIG. 4 is then further shaped in hot condition so as to impart the appropriate meniscus outline to the grooves so as to enable them to receive the lenses.

The method according to the invention, in addition to permit to obtain frames which are very wrapping, permits to obtain an arrangement of the grooves 14 in the relevant rims so that the lenses do not protrude from the planes on which the rims lie and thus are protected by the frame which prevents them from being scratched if, inadvertently, the spectacles are laid flat on comparatively rough surfaces. In addition, the grooves 14 as arranged out of centre in the respective rims 13 can receive, indifferently, both positive and negative optical lenses so that no portion of the lens edge remains exposed.

What is claimed is:

1. A method for fabricating spectacle frames having curved lens areas comprising the steps of: preparing a planar slab of thermoplastic material; hot-working said planar slab of thermoplastic material to pre-shape it with partially curved lens areas; milling said lens areas of said pre-shaped slab to provide apertures for the lenses; milling in a plane the internal sides of the lens rims surrounding said apertures to provide coplanar grooves for engaging the lenses; hot-working the pre-shaped and milled slab to meniscus-shape the lens rims and the grooves therein.

2. The method as defined in claim 1 including the step of shaping the bridge of the frame during the step of hot-working said planar slab of thermoplastic material to pre-shape it with partially curved lens area.

* * * * *

UNITED STATES PATENT OFFICE
CERTIFICATE OF CORRECTION

Patent No. 3,868,438                              Dated February 25, 1975

Inventor(s) Vigilio Fedon

It is certified that error appears in the above-identified patent and that said Letters Patent are hereby corrected as shown below:

On the Cover Sheet, item [75] should read as follows:  -- Inventor: Vigilio Fedon, Frazione Di Vallesella, Belluno, Italy --.

Signed and sealed this 20th day of May 1975.

(SEAL)
Attest:

RUTH C. MASON
Attesting Officer

C. MARSHALL DANN
Commissioner of Patents
and Trademarks